United States Patent [19]

Lockwood, Sr.

[11] Patent Number: 4,529,161
[45] Date of Patent: Jul. 16, 1985

[54] BREAK-AWAY MIRROR BRACKET

[76] Inventor: David G. Lockwood, Sr., 2317 Bragg St., Chattanooga, Tenn. 37406

[21] Appl. No.: 514,597

[22] Filed: Jul. 18, 1983

[51] Int. Cl.³ ............................................ F16M 13/00
[52] U.S. Cl. .................................. 248/549; 248/475.1
[58] Field of Search .................... 248/549, 548, 475.1, 248/479, 476, 480, 482, 900; 52/98, 99; 403/2; 411/903, 902, 900, 542

[56] References Cited

U.S. PATENT DOCUMENTS

| 2,969,831 | 1/1961 | Eames | 411/902 |
|---|---|---|---|
| 3,204,989 | 9/1965 | Wilson | 411/542 |
| 3,635,435 | 1/1972 | Perison | 248/549 |
| 4,012,022 | 3/1977 | Tomita | 248/549 |
| 4,066,235 | 1/1978 | Hashiguchi | 248/549 |
| 4,171,873 | 10/1979 | Repay et al. | 248/479 |
| 4,368,868 | 1/1983 | Urban | 248/549 |
| 4,436,273 | 3/1984 | Yuda et al. | 403/2 |

Primary Examiner—William H. Schultz
Assistant Examiner—Ramon O. Ramirez
Attorney, Agent, or Firm—Alan Ruderman

[57] ABSTRACT

A mounting bracket for attaching a mirror to the exterior of a vehicle, the bracket having a pair of metal plates disposed in face-to-face abutting relationship and encased within a synthetic plastic resin frangible along the plane of abutment of the plates. Each plate includes threaded members so that the bracket may be secured to the vehicle and to mirror supporting members.

7 Claims, 5 Drawing Figures

BREAK-AWAY MIRROR BRACKET

BACKGROUND OF THE INVENTION

This invention relates to a break-away bracket and more particularly to such a bracket for use in mounting a rear view mirror on the outside of a vehicle.

Rear view mirrors of the type mounted on the exterior of a vehicle are conventionally attached to a rigid bracket which in turn is bolted to the vehicle door or fender. In the case of a truck cab for pulling a wide bodied vehicle and other wide bodied vehicles the mirror is connected to elongated arms which are secured to the bracket, the bracket being bolted directly to the door of the vehicle. If the mirror or the arms strike an external object, such as another vehicle, a tree, building etc., the moment acts to force the bracket away from the vehicle pulling the attaching bolts so that costly damage results to the vehicle body portion to which the bracket is attached.

The known relevant prior art mirror attaching brackets are those illustrated in U.S. Pat. Nos. 3,599,926 (Takahashi); 3,887,156 (Hugonnier); 4,066,235 (Hashiguchi) and 4,368,868 (Urban). Takahashi and Hashiguchi relate to the mounting of interior mirrors while Hugonnier and Urban are directed to the mounting of mirrors on the exterior of the vehicle. The Takahashi and Hashiguchi patents respectively show a break-away plastic plate interposed between an attaching base of a rear view mirror and the body of the vehicle, the plate having a groove surrounding the area where an attaching screw connects the plates to the base and breaks at the groove when a force is applied to the mirror; and a rear view mirror having a pair of plastic mirror mounting members which are connected together at a frangible portion formed by tiny holes about a central portion of one of the members, the other member together with the central portion breaking away from the first portion on impact. The Hugonnier and Urban patents respectively disclose the end of the mirror arm connected within the bore of a socket of a base secured to the vehicle, the connection between the arm and the base being through a plastic ring that separates to release the arm when the mirror is impacted; and a mirror carrying arm capable of breaking away from the hollow threaded neck of a plastic bracket when the mirror is impacted. In each of these prior art disclosures a relatively complex and expensive mirror mounting arrangement is proposed to overcome the difficulties of conventional mirror mounting brackets.

SUMMARY OF THE INVENTION

Consequently, it is a primary object of the present invention to provide a simple and inexpensive break-away mirror mounting bracket which can be readily attached to the exterior of a vehicle and simply shears upon impact of the mirror or the mirror supporting arms against an extraneous object.

It is another object of the present invention to provide a break-away mounting bracket for supporting a mirror on the exterior of a vehicle body, the bracket comprising a pair of separable plates encased in a frangible synthetic plastic, the casing breaking upon impact to separate the plates.

It is a further object of the present invention to provide a pair of abutting metal plates, one plate being secured to a vehicle and the other plate being supporting to mirror attaching means, the plates being encased within a brittle plastic molded about the plates so that if the mirror or the mirror attaching means is impacted by a force, the plastic will fracture and the plates will separate.

Accordingly, the present invention provides a mounting bracket for attaching a mirror, mirror supporting means or the like to the exterior of a vehicle, the bracket being such that it will shear upon impact of the mirror or supporting means by an extraneous object without resulting in damage to the structure of the vehicle. The mirror comprises a pair of plates, preferably metal, disposed in face-to-face abutting relationship and encased within a frangible synthetic plastic housing. Each plate includes means for securing it to a respective one of either the vehicle body or the mirror supporting means. When an extraneous force or object strikes the mirror or its supporting means, the plastic will shear along the frangible edges lying in the plane of the abutting plate faces, thereby resulting in separation of the mirror mounting plate from the vehicle mounted plate. Consequently, damage to the vehicle is precluded.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
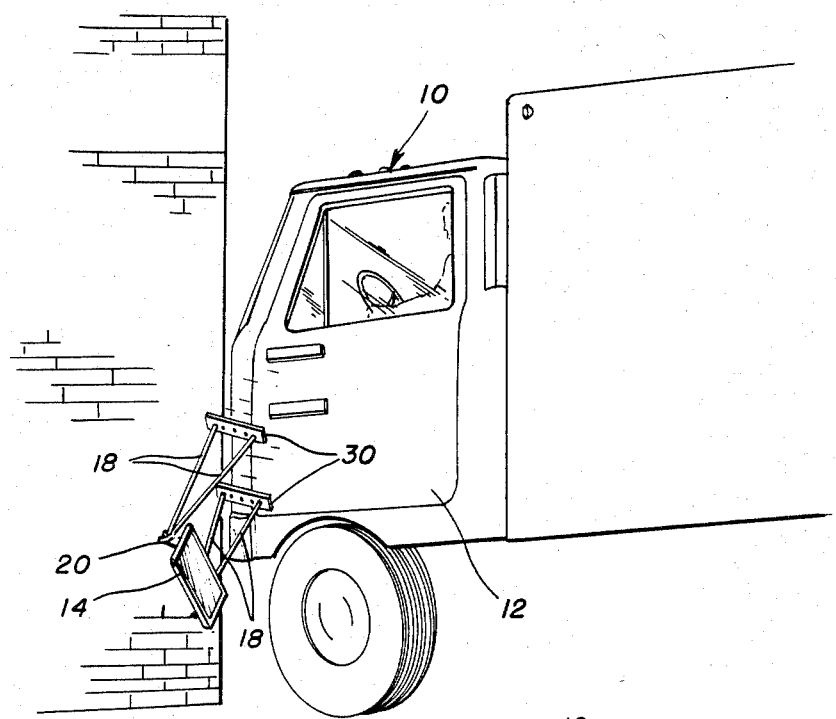
FIG. 1 is an elevational view of a vehicle having a mirror mounted on a mirror mounting bracket constructed in accordance with the principles of the present invention and depicting separation of the bracket plates upon impact of the mirror supporting members with a wall.
Figure 2:
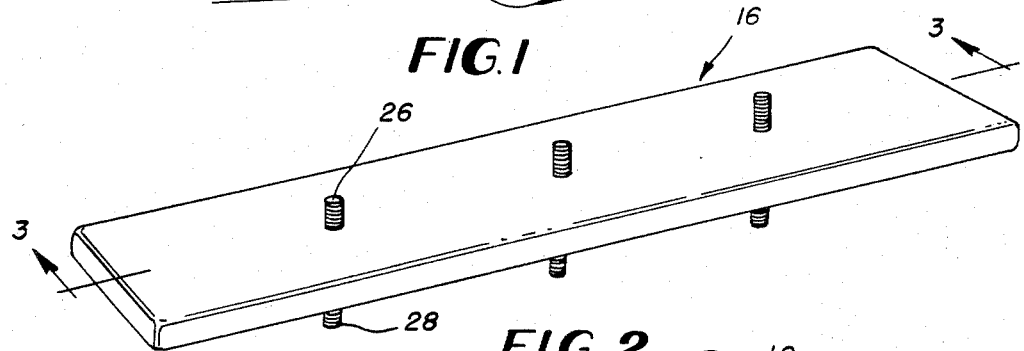
FIG. 2 is a perspective view of the bracket of FIG. 1.

Referring now to the drawings, FIG. 1 illustrates a truck 10 having a door 12 on which a mirror 14 is mounted by means of a pair of mirror mounting brackets, the brackets being depicted as shearing, but each is indicated generally at 16 in FIG. 2. Since the mirror 14 of a truck is generally huge a pair of such brackets is secured in spaced apart relationship on the door 12 and to mirror supporting means such as arms 18 pivotably mounted to a lug 20 at respective upper and lower ends of the mirror.

Figure 3:
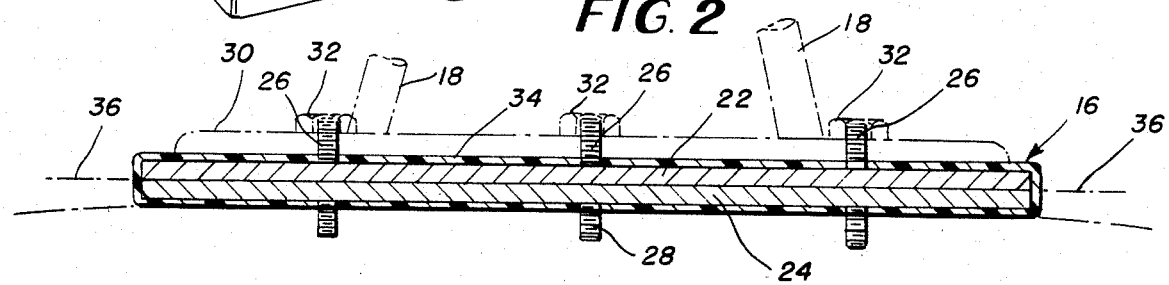
FIG. 3 is a cross-sectional view taken substantially along the plane 3—3 of FIG. 2.

As best illustrated in FIG. 3, the mirror mounting bracket 16 comprises a pair of metal plates 22 and 24 respectively, the plates being mounted in face-to-face abutting relationship. Each plate 22, 24 may have a plurality of threaded studs 26, 28 respectively secured to the non-abutting faces as by welding or the like. The studs 26 may be secured to conventional brackets 30 by means of nuts 32, while the studs 28 may be secured to the vehicle body such as the door 12 also by means of nuts (not illustrated) secured either directly to the door 12 or to other brackets. In the alternate form illustrated in FIGS. 4 and 5 the studs 28 may be replaced by screw members 128 having enlarged heads 129, the threaded shank portion of the screw members extending through an aperture in the plate 24 which allows the threaded portion but not the head 129 to extend therethrough, but the plate 22 has an aperture permitting the head 129 to pass freely therethrough.

The plates are disposed in abutting relationship with the studs 26, 28 extending in opposite directions, and the plates are encapsulated within a plastic casing or housing 34 which is molded about the plates while permitting the studs 26, 28 to extend therefrom. The casing 34 is preferably formed from any brittle synthetic resin such as the plastic polymers including polypropylene, polyethylene, polyoctal etc. The thickness of the casing is such that it securely holds the plates 22 and 24 together under normal circumstances and is of a strength to withstand minor shocks and jolts, but if a sufficient force is applied to the mirror 14 or the supporting arms 18, the casing will fracture along the plane of the abutting faces of the plates 22 and 24, illustrated at 36. The plane 36 is a frangible plane along which the plastic material will readily break due to an impact force applied tending to separate the plates 22 and 24 in the shearing direction.

Figure 4:
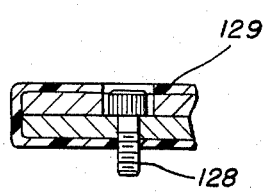
FIG. 4 is a cross-sectional view similar to FIG. 3, but of a portion of the bracket having modified vehicle securing means.
Figure 5:
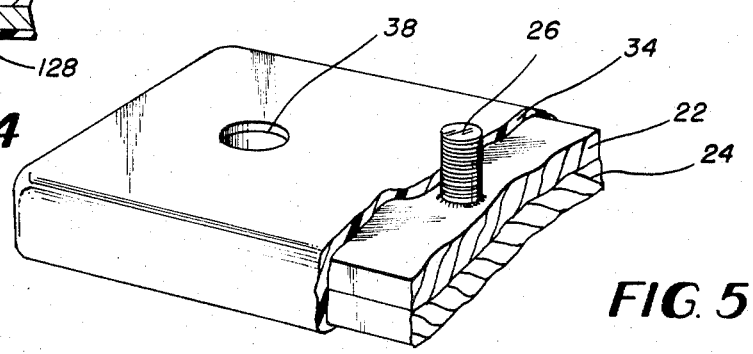
FIG. 5 is a fragmentary perspective view partly broken away of the modification illustrated in FIG. 4.

In the modification illustrated in FIGS. 4 and 5 the casing 34 includes an aperture 38 through which the screw 128 together with the head 129 may pass so that the head 129 extends through the enlarged aperture in the plate 22 to abut the surface of the plate 24 lying in the plane 36. Since the head 129 of the screw 128 does not physically engage the plate 22 a shearing force between the plates 22 and 24 will not be absorbed by the screw 128 but will be applied directly to the casing 34 as in the embodiments of FIGS. 2 and 3, to fracture the casing along the plane 36.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A mounting bracket for attaching a mirror or the like to the body of a vehicle, said mirror having supporting means disposed between the mirror and the vehicle, said bracket comprising first and second plates, each plate having at least one substantially planar surface, said plates being disposed with their respective planar surfaces in face-to-face abutting relationship, a synthetic plastic casing disposed about and encapsulating said plates for fastening said plates together, securing means operatively secured only to a respective one of the plates and extending from the respective face opposite to that of the abutting faces for attachment respectively to the mirror supporting means and the vehicle, and said casing having a thickness for normally maintaining said plates in abutment and readily frangible along the plane of said planar surfaces, whereby said casing may shear along said plane to separate said plates upon forcible impact of the mirror against an extraneous object.

2. A mounting bracket as recited in claim 1, wherein said securing means comprises threaded studs secured to each plate.

3. A mounting bracket as recited in claim 2, wherein said studs are welded to the respective plate.

4. A mirror mounting bracket as recited in claim 1, wherein said securing means for securing said bracket to said supporting means comprises threaded studs secured to one of said plates, and screws having a threaded shank and an enlarged head secured to the other plate, said shank extending through an aperture in said other plate, said head extending through an aperture in said one plate and abutting the other plate along the plane of said planar surfaces.

5. A mounting bracket as recited in claim 4, wherein said enlarged head extends through an aperture in the casing adjacent the threaded studs.

6. A mounting bracket for attaching a supported member to a supporting member in extended relationship, said bracket being frangible so as to break upon lateral impact of the supported member with an extraneous object without damaging the supporting member, said bracket comprising first and second plates, each plate having at least one substantially planar surface, said plates being disposed with their respective planar surfaces in face-to-face abutting relationship, a synthetic plastic casing disposed about and encapsulating said plates for fastening said plates together, securing means operatively secured only to a respective one of the plates and extending from the respective face opposite to that of the abutting faces for attachment respectively to the supported member and the supporting member, and said casing having a thickness for normally maintaining said plates in abutment and readily frangible along the plane of said planar surfaces, whereby said casing may shear along said plane to separate said plates upon forcible impact of the supported member against an extraneous object.

7. A mounting bracket as recited in claim 6, wherein said synthetic plastic casing comprises a synthetic polymer.

* * * * *